June 10, 1930.  E. E. CHARLTON  1,762,712
GLOW TUBE MEASURING DEVICE
Filed Aug. 10, 1925

Inventor:
Ernest E. Charlton,
by *Alexander S. —*
His Attorney.

Patented June 10, 1930

1,762,712

UNITED STATES PATENT OFFICE

ERNEST E. CHARLTON, OF SCHENECTADY, NEW YORK, ASSIGNOR TO GENERAL ELECTRIC COMPANY, A CORPORATION OF NEW YORK

GLOW-TUBE MEASURING DEVICE

Application filed August 10, 1925. Serial No. 49,359.

My invention relates to a method and apparatus for measuring electrical phenomena such as current and voltage, and in particular to inexpensive apparatus of general application for this purpose.

I have discovered that glow tubes have characteristics which permit of their being substituted for such measuring devices as ammeters and voltmeters under certain conditions which will be explained in detail hereinafter.

In general I utilize the glow tube for measuring purposes by causing the quantity to be measured to act upon the glow tube and noting the effect thereof. Preferably the glow tube is associated with a condenser in such a way that energy is stored in the condenser and discharged through the glow tube.

Figure 1:
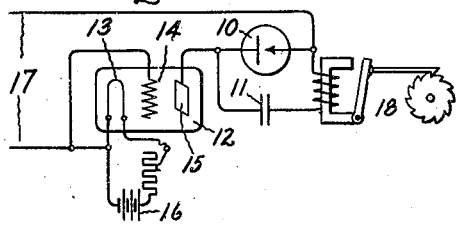
Figure 3:
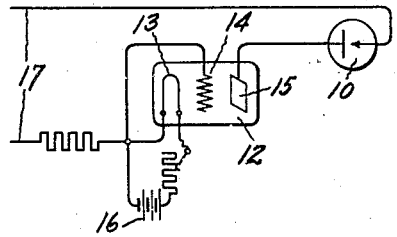
Figure 2:
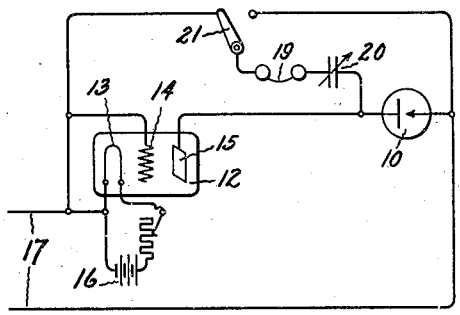
Figure 4:
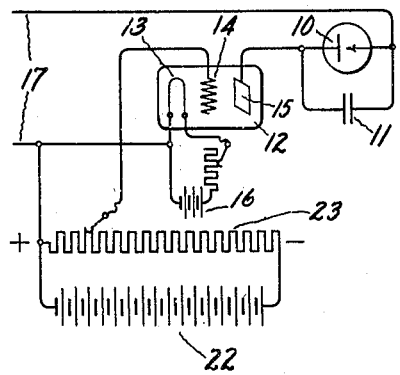
Figure 5:
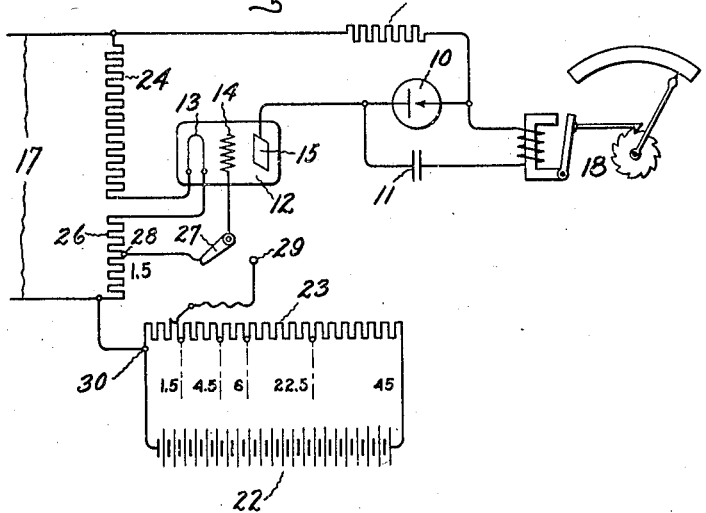

The features of my invention which are believed to be novel and patentable will be pointed out in the claims appended hereto. For a better understanding of my invention, reference is made in the following description to the accompanying drawings in which Figs. 1, 2 and 3 are modifications of my invention for measuring current; Fig. 4 is an arrangement for measuring voltage, and Fig. 5 is an arrangement for measuring both current and voltage.

Referring to Fig. 1, the current to be measured is caused to flow through a circuit containing a glow tube 10 and a condenser 11 connected in parallel. In this case the measurement desired is the electron emission current of an electron discharge device indicated at 12. The device 12 comprises a filament 13, a grid 14 and a plate 15, enclosed in an evacuated chamber. 16 represents a battery for heating the filament and the source of energy for operating the device is represented at 17. This source may be an ordinary alternating current or direct current source such as a 110 volt lighting circuit, so long as its potential is above the sparking potential of the glow tube 10. If the source 17 is direct current, or is alternating current, and the device 12 is a rectifying device, the glow tube 10 may be either of the rectifying or non-rectifying type. If the source 17 is alternating and the device 12 is non-rectifying, the glow tube must be of the rectifying type. The condenser 11 is of known capacity. In operation the electron emission from the device 12 charges the condenser 11 to a voltage where the glow tube flashes, thus discharging the condenser. The number of flashes of the glow tube in a given time interval is a measure of the quantity of energy stored in the condenser during that interval, or a measure of the current given out by the plate circuit of the device 12. By calibration, very accurate measurements can be made of the electron emission and if desired, a relay operated counting device, such as is represented at 18, may be provided. The electron emission is independent of the voltage of source 17 for considerable variations in voltage.

Fig. 2 shows another arrangement for measuring electrical current with a glow tube 10 in series with 12, the unknown, to be measured. Head phones 19 placed in series with a calibrated variable condenser 20 and shunted either around the unknown or around the glow tube gives an audible as well as a visual means of measurement. With a direct current source of supply 17 the glow tube may be of the rectifying or non-rectifying type, but with alternating current supply the glow tube must be of the rectifying type if the condenser 20 is shunted around the unknown as represented. By means of the switch represented at 21 the condenser may be connected in either of the ways mentioned.

In Fig. 3 a glow tube 10 is placed in series with the unknown tube 12 for measuring its electron emission and the condenser is omitted. Here the area of the cathode surface of the glow tube that is covered with the glow discharge is a rough measure of the amount of current flowing.

Fig. 4 represents an arrangement for measuring the voltage of a source such as a battery 22. A high resistance 23 is connected across the unknown potential and a portion of this resistance is placed on the grid 14 of the pliotron 12 as a negative bias to control the rate of charging the condenser 11. The known relationship of the electron emission of the pliotron to the amount of grid bias serves as a measure of the unknown voltage. The glow tube 10 may be of the rectifying or non-rectifying type. This arrangement can of course be used in any of the above circuits for measuring the curret emission of an unknown pliotron when the negative grid bias is kept constant. Likewise the resistance 23 may constitute a shunt in a circuit the current in which it is desired to measure and the rate of discharge of the tube 10 will be a measure of such current.

Fig. 5 shows an arrangement which may be used for measuring both current and voltage and which is particularly useful in testing radio sets for faulty tubes and weak batteries. Here the filament 13 is heated by the source 17 through resistances 24 and 26. A resistance 25 will also be desirable in the glow tube circuit. When the switch 27 is connected as shown to a joint 28 of the resistance 26 the rate of discharge of the glow tube is a measure of the electron emission of tube 12. When the switch is thrown to contact 29 the same device may be used for testing the voltage of battery 22. If point 28 is selected so as to have the same potential as point 29 from the common point 30 when the battery 22 is normal, it will be evident that the grid 14 will have the same potential for both connections and thus the glow tube 10 will give the same standard count for both connections when the tube 12 and battery 22 are in normal condition. Usual battery voltages to be tested in radio sets are 1.5, 4.5, 6, 22.5 and 45 volts. Thus we may select points along the resistance 23 such as those marked with the above voltages so that a battery of corresponding normal voltage may be connected between such point and 30, and if the battery is in normal condition the standard flash count of glow tube 10 above referred to will occur.

In accordance with the provisions of the patent statutes, I have described the principle of operation of my invention, together with the apparatus which I now consider to represent the best embodiment thereof; but I desire to have it understood that the apparatus shown and described is only illustrative and that the invention may be carried out by other means.

What I claim as new and desire to secure by Letters Patent of the United States, is:

1. A system for measuring electrical phenomena comprising an electron discharge device having a plate circuit, a glow tube connected in series relation with said circuit, and a source of supply for said circuit having a voltage above that of the sparking voltage of the glow tube.

2. A system for measuring the electron discharge current of an electron discharge device comprising in combination with such a device having filament, grid and plate electrodes, a glow tube connected in series relation with the plate of said device, and a source of supply for said series circuit having a voltage in excess of the sparking voltage of said glow tube.

3. A system for measuring the electron discharge current of an electron discharge device comprising in combination with such a device having filament, grid and plate electrodes, a glow tube device connected in series relation with the plate of said electron discharge device, a source of supply for said series circuit having a voltage in excess of the sparking voltage of said glow tube device, and a condenser shunted across one of said devices.

4. A system for measuring the electron discharge current of an electron discharge device comprising in combination with such a device having filament, grid and plate electrodes, a glow tube connected in series relation with said device, a source of supply for said series circuit having a voltage above the sparking voltage of said glow tube, and a condenser shunted across said glow tube.

5. A system for measuring the electron discharge current of an electron discharge device comprising in combination with such a device having filament, grid and plate electrodes, a glow tube connected in series relation with said device, a source of supply for said series circuit having a voltage in excess of the sparking voltage of said glow tube, connections for heating the filament of said device from said source and connections for obtaining a difference of potential between the grid and filament of said device.

6. A measuring system comprising in combination with an electron discharge device having filament, grid and plate electrodes, a glow tube connected in series relation with said device, a source of supply for said series circuit having a voltage in excess of the sparking voltage of said glow tube, connections for heating the filament of said device from said source, and connections for alternately obtaining negative biasing potentials on the grid of said device from said source and from an additional source the potential of which it is desired to measure.

7. A measuring system comprising in combination with an electron discharge device having filament, grid and plate electrodes, a glow tube connected in series relation with said device, a condenser connected in shunt to said glow tube, a source of supply for said series circuit having a potential in excess of the sparking potential of said glow tube, connections for heating the filament of said device from said source, a second source the potential of which it is desired to measure, and connections for alternately obtaining a difference of potential between the filament and grid of said device from said two sources.

8. A measuring system comprising in combination with an electron discharge device having filament, grid and plate electrodes, a glow tube connected in series relation with said device, a condenser connected in shunt with said glow tube, a source of supply for said series circuit having a potential in excess of the sparking potential of said glow tube, a second source of potential, resitances in shunt to said two sources having a common connection point with respect to the filament of said device, and means for alternately connecting the grid of said device to points on said resistances such that when the potentials of the two sources are approximately normal the grid has approximately the same biasing voltage for either connection.

9. In an electric circuit containing a condenser of known capacity and a glow tube connected in parallel, the method of measuring the flow of current in said circuit which consists in allowing said current to continuously charge the condenser, discharging the condenser through the glow tube whenever the charge reaches a predetermined potential, and counting the number of such discharges over a given period of time.

10. The method of measuring the electron discharge current of an electron discharge device which consists in continuously causing such current to charge a condenser of known capacity, discharging the condenser whenever its charge reaches a predetermined potential, and counting the number of such discharges over a given period of time.

In witness whereof, I have hereunto set my hand this 8th day of August, 1925.

ERNEST E. CHARLTON.